Figure 1:
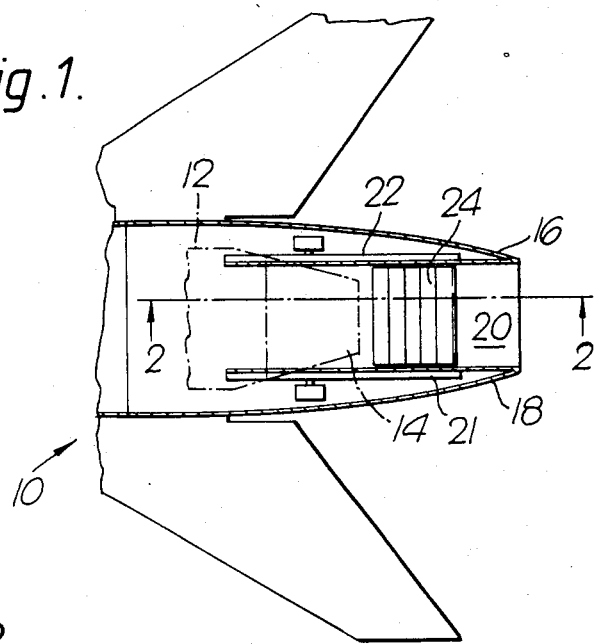

United States Patent [19]

Hall

[11] Patent Number: 4,638,946
[45] Date of Patent: Jan. 27, 1987

[54] VARIABLE CONFIGURATION EXHAUST DISCHARGE OPENING FOR A JET PROPULSION ENGINE

[75] Inventor: John M. Hall, Bristol, England

[73] Assignee: Rolls-Royce Limited, London, England

[21] Appl. No.: 78,053

[22] Filed: Sep. 24, 1979

[30] Foreign Application Priority Data

Oct. 2, 1978 [GB] United Kingdom ............... 38936/78

[51] Int. Cl.⁴ .............................................. F02K 1/09
[52] U.S. Cl. ........................... 239/265.33; 239/265.37
[58] Field of Search ..................... 239/265.19, 265.33, 239/265.35, 265.37, 265.43

[56] References Cited

U.S. PATENT DOCUMENTS

| | | | |
|---|---|---|---|
| 3,519,207 | 7/1970 | Clough | 239/265.19 X |
| 3,642,209 | 2/1972 | Stahl | 239/265.33 |
| 3,704,829 | 12/1972 | Hall | 239/265.35 |
| 4,088,270 | 5/1978 | Maiden | 239/265.33 X |
| 4,175,385 | 11/1979 | Nash | 239/265.37 |

Primary Examiner—Stephen C. Bentley
Attorney, Agent, or Firm—Parkhurst & Oliff

[57] ABSTRACT

A gas turbine jet propulsion engine has a rectangular exhaust gas outlet 14. A pair of U-shaped tracks 21,22 one on each side of the outlet and which extend downstream of it, support rollers carrying the plates 24a etc. of a pair of articulated deflectors 24,26, one above and one below the outlet. The deflectors are translatable along the tracks between the final exhaust discharge opening of the engine. The configurations include a convergent divergent nozzle, a thrust vectoring nozzle and thrust reversing outlets.

5 Claims, 10 Drawing Figures

VARIABLE CONFIGURATION EXHAUST DISCHARGE OPENING FOR A JET PROPULSION ENGINE

The present invention relates to apparatus for varying the configuration of the final exhaust discharge opening of a gas turbine jet propulsion engine. More particularly the present invention relates to a construction of a thrust deflector of the kind which, in operation, enables the direction of discharge of the propulsion gases of the engine to vary relative to the axis of the engine. The invention is further applicable to a thrust nozzle the cross sectional area of which it is desired to vary.

A conventional variable area thrust nozzle for a gas turbine jet propulsion engine, comprises a nozzle outlet portion having rigid flaps which are pivotally mounted at or near their upstream ends to a fixed structure. A force is applied to the flaps in a direction which causes the flaps to pivot across the gas flow to vary the final discharge area of the nozzle. A typical example of a variable area nozzle as described hereinbefore is shown in British patent specification No. 792,962. Such nozzles involve a considerable number of moving parts, and are complex, heavy and expensive to manufacture.

One of the objects of the present invention is to provide a nozzle of variable area and which is of much simplified design so that it is relatively less expensive to make and is lighter in weight than the conventional nozzle exemplified in the patent specification referred to above.

Another feature of the conventional variable area nozzle referred to above is that the flaps are fixed in position in relation to the remainder of the engine and they cannot be moved to a position where the gas will be deflected from a generally axial direction. i.e. the flaps generally do not function as thrust deflectors or thrust reversers although this has been proposed.

A further object of the present invention is to provide apparatus whereby the configuration of the final exhaust discharge opening of a gas turbine jet propulsion engine can be varied not only to vary its area but also to vary the direction of the exhaust gas discharge therefrom to provide thrust vectoring or thrust reversal.

A still further object of the invention is to provide apparatus whereby the final exhaust discharge opening of a gas turbine jet propulsion engine having a fixed area nozzle may be configured for thrust vectoring or thrust reversal.

According to the present invention there is provided apparatus for varying the configuration of the final exhaust discharge opening of a gas turbine jet propulsion engine comprising a jet pipe at the downstream end of the engine and having a rectangular exhaust gas outlet therefrom, track means associated with the downstream end of the engine on both sides of the exhaust gas outlet and extending downstream beyond the exhaust gas outlet, at least one flexible deflector extending between the track means and defining with the exhaust gas outlet a final discharge opening for the engine exhaust gases, means for engaging each deflector with the track means on both sides of the exhaust gas outlet and means for moving each deflector along the track means whereby it may be selectively positioned in or out of exhaust gases leaving the outlet to vary the configuration of the final discharge opening.

The track means may be connected to part of the fuselage of an aircraft on which the engine is mounted or may be mounted on the jet pipe or other static structure of the engine.

In a preferred form of the invention the track means is in the form of two generally U-shaped tracks, one on each side of the engine jet pipe and extending downstream of the exhaust gas outlet. Two deflectors are provided each comprising a number of plates hinged together to form a multi-articulated deflector and each extending across the width of the jet pipe, one above, and one below the engine, when the engine is in its normal flight attitude.

Alternatively, only a single deflector may be provided where the engine has a fixed nozzle area and thrust reverse or thrust vectoring only are required.

In one form of the invention two deflectors are provided and a chain and sprocket arrangement is used for positioning the chains said arrangement comprising two pairs of continuous chains, there being one pair of chains associated with each of the track means and one chair for each of the deflectors, each chain being connected at its opposite ends to the upstream and downstream ends of its respective deflector.

The deflector or deflectors are preferably arranged by suitable positioning along the tracks to vary the final exhaust discharge opening into configurations suitable for operation as, a convergent-divergent final nozzle, a thrust reverser, or a thrust vectoring nozzle.

Figure 2:
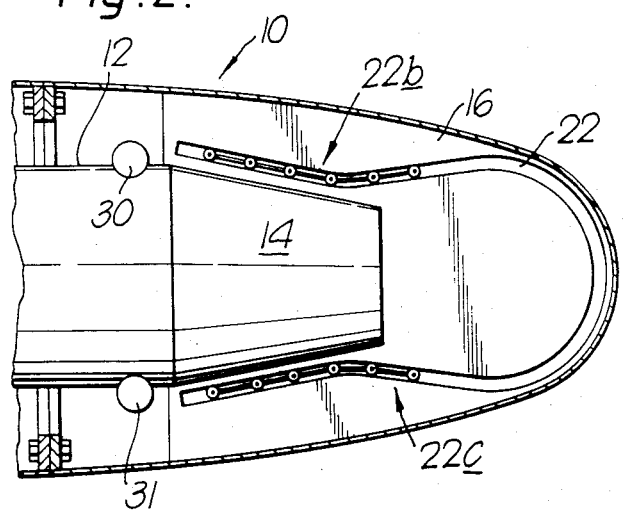
Figure 3:
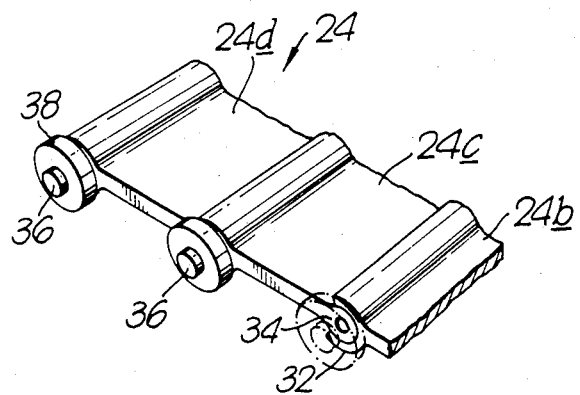
Figure 4:
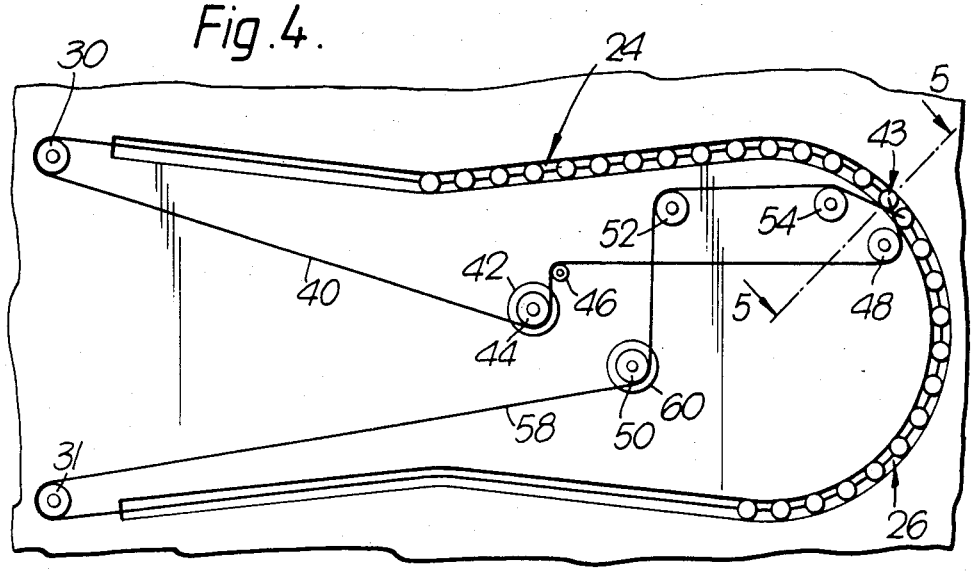
Figure 5:
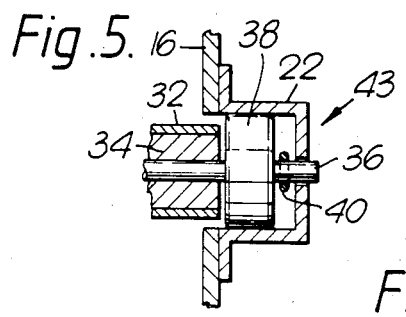
Figure 6:
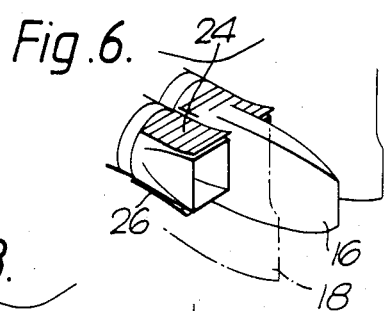

The invention will now be described, by way of example only, and with reference to the accompanying drawings in which:

FIG. 1 is a part plan view of an aircraft incorporating apparatus in accordance with an embodiment of the invention, FIG. 2 is an enlarged view on line 2—2 of FIG. 1, FIG. 3 is a pictorial part view of an assembly of the apparatus of FIG. 1, FIG. 4 is an enlarged view of the apparatus embodied in FIG. 1, FIG. 5 is an enlarged view on line 5—5 of FIG. 4, FIGS. 6 to 10 are pictorial views of the apparatus embodied in FIG. 1, disposed in various positions with respect to the aircraft of FIG. 1.

In FIG. 1, the downstream end of an aircraft fuselage is indicated generally by the numeral 10. The fuselage 10 contains a jet propulsion engine, of which only the downstream end 12 of the jet pipe is shown.

The downstream end 12 of the jet pipe defines an exhaust gas outlet in the form of a rectangular propulsion nozzle 14.

Fuselage 10 terminates in a pair of walls 16, 18 the inner surfaces of which are flat and which define between them, a space 20 into which propulsion nozzle 14 projects.

Walls 16, 18 carry respective roller tracks 21, 22 and the roller tracks 21, 22 in turn, support between them a pair of deflectors 24 and 26, only one, 24 being shown in FIG. 1.

Referring now to FIG. 2, track 22 is seen to be generally "U" shaped, and having straight portions 22b, 22c lying parallel with and adjacent, the top and bottom surfaces of the rectangular propulsion nozzle 14. Track 21 (not shown in FIG. 2) is complementary to track 22, in shape and position, so as to enable free movement of deflectors 24 and 26 along the paths defined by them.

Two pairs of sprocket wheels, of which only one pair 30,31, is shown, are mounted in the fuselage 10 for reasons which will be explained later in this specification.

In FIG. 3, deflector 24 is shown as being constructed from a number of plates 24b, 24c, 24d plus a further number of identical plates (not shown) to make up a desired deflector length. Each plate is joined to the next adjacent plate via a hollow cylindrical portion 32 on the one, which pivotably engages a solid cylindrical portion 34 on the other. Assembly is achieved by sliding portion 32 over portion 34 in a direction axially of the hinge joint.

Axles 36 are passed through each solid portion 34 and a roller 38 is fitted on each end of each axle 36. The complete articulated deflector 24 is then fitted into the top portion of track 22 as viewed in FIG. 2 so that rollers 38 are in rolling engagement in track 22. The other deflector 26 (FIG. 4) is constructed in like manner and fitted into the bottom portion of track 22 as viewed in FIG. 2.

Referring now to FIG. 4, there is shown the means for moving each articulated deflector 24, 26 along its respective portions of tracks 21,22.

Deflector 24 is moved by a pair of roller chains 40, (only one being shown diagrammatically) one end of which is fastened to one end 41 of deflector 24 and the other end of which, is fastened to the other end 43 of the deflector 24. The other chain (not shown) is fastened to the deflector in the same way but on its opposite side so as to provide a symmetrical pulling force during operation.

The pulling force is provided by a motor 42 one end of which supports chain 40 via a sprocket wheel 44. Chain 40 is supported by further sprocket wheels 46 and 48. All of the sprocket wheels for supporting and driving the chains 40 are shown diagrammatically. Sprocket wheels 46, 48 rotate and are supported on side wall 16. It can be seen that chain 40 is positioned with respect to deflector 24, such that any pulling force exerted on chain 40 by rotation of motor 42 and its associated sprocket wheel 44, will act on the deflector in a line substantially coincident with the path defined by track 22. This is further ensured by arranging the relevant part of the chain 40 within the confines of track 22. This is best seen in FIG. 5.

Deflector 26 is moved in a manner similar to that of deflector 24, by means of sprocket wheels 31, 50, 54 and supporting chains 58 which exert a pull on deflector 26 along a line substantially coincident with the path defined by its respective track, power being provided by a further motor 60. Once again the chains and sprocket wheels are shown diagrammatically, and it will be understood that similar sprocket wheels and chains are provided on the other side of the deflector.

Motors 42 and 60 can be operated singly or together, so that it is possible to cause each deflector to adopt a desired position with respect to propulsion nozzle 14. Thus in FIG. 6 both deflectors 24 and 26 have been moved to their extreme, upstream positions, so as to have no affect on the direction or velocity of the exhausted gas. The area of the final exhaust discharge opening in this configuration is that of the fixed propulsion nozzle 14 which is slightly convergent but has a sufficiently large outlet area for reheat to be utilised.

Figure 7:
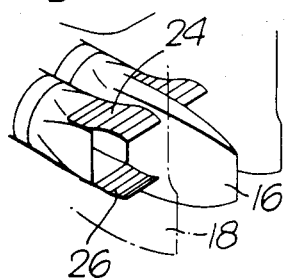

In FIG. 7, both deflectors 24 and 26 have been moved to a position downstream of propulsion nozzle 14, so as to effectively reduce the area of the final exhaust discharge opening and to provide a more convergent configuration suitable for the cruise, flight condition of the aircraft.

Figure 8:
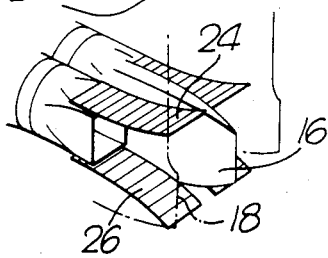

In FIG. 8 deflectors 24 and 26 have been positioned so as to provide a diverging configuration for the final exhaust discharge opening and thus effect a convergent-/divergent nozzle profile.

Figure 9:
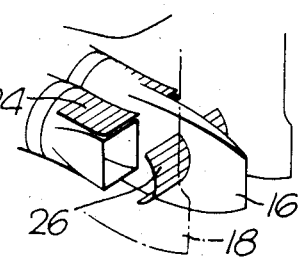

In FIG. 9 deflector 24 has been retained in its upstream position, but deflector 26 has been moved around the curve of the tracks to provide a thrust reversing configuration for the final exhaust discharge opening.

Figure 10:
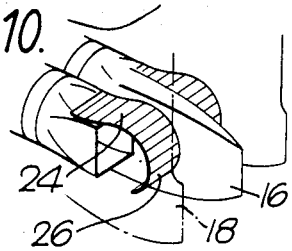

In FIG. 10, deflector 24 has been moved to the position shown in FIG. 7 and deflector 26 has been moved to the position shown in FIGS. 4 and 8. This configuration for the final exhaust discharge opening causes the exhaust gases to be deflected downwards. Thrust vectoring is therefor achieved.

Whilst the invention has been described as using two deflectors 24, 26 the person skilled in the art will appreciate that only one, of suitable length may be used for thrust vectoring and/or thrust reversing if a fixed area nozzle only is required on the engine for forward propulsion.

I claim:

1. Apparatus for varying the configuration of the final exhaust discharge opening of a gas turbine jet propulsion engine comprising, a jet pipe at the downstream end of the engine and having a rectangular exhaust gas outlet therefrom, track means associated with the downstream end of the engine on both sides of the exhaust gas outlet and extending downstream beyond the exhaust gas outlet, the track means are generally U-shaped and have portions extending above and below the exhaust gas outlet from the jet pipe, said portions being interconnected by a curved portion downstream of the exhaust gas outlet, two flexible deflectors extending between the track means and defining with the exhaust gas outlet a final discharge opening for the engine exhaust gases, one of said deflectors is positioned on top and the other of said deflectors is positioned beneath the exhaust gas outlet from the jet pipe, means for engaging each deflector with the track means on both sides of the exhaust gas outlet and means for moving each deflector along the track means whereby it may be selectively positioned in or out of the exhaust gases leaving the outlet to vary the configuration of the final discharge opening.

2. Apparatus as claimed in claim 1 and wherein each deflector comprises a plurality of plates hinged together to form a multi-articulated deflector.

3. Apparatus as claimed in claim 2 and wherein each plate carries a roller at each end thereof for engagement with said track means.

4. Apparatus as claimed in claim 3 and wherein a chain and sprocket arrangement is provided for positioning the deflectors and which comprise of two pairs of continuous chains, there being one pair of chains associated with each of the track means and one chain for each of the deflectors, each chain being connected at its opposite ends to the upstream and downstream ends of its respective deflector.

5. Apparatus as claimed in claim 1, wherein the configuration of the final discharge opening is capable of producing selectively a convergent-divergent nozzle, thrust reversing outlets or a thrust vectoring nozzle.

* * * * *